United States Patent [19]

Maeda

[11] Patent Number: 4,470,086

[45] Date of Patent: Sep. 4, 1984

[54] RECORD REPRODUCTION APPARATUS

[75] Inventor: Masaya Maeda, Kanagawa, Japan

[73] Assignee: Canon Kabushiki Kaisha, Tokyo, Japan

[21] Appl. No.: 332,207

[22] Filed: Dec. 18, 1981

[30] Foreign Application Priority Data

Dec. 24, 1980 [JP] Japan ................... 55-184860

[51] Int. Cl.³ .............. G11B 5/08; G11B 15/60; G11B 15/18
[52] U.S. Cl. .................................. 360/85; 360/95; 360/130.23
[58] Field of Search ............. 360/85, 83, 95, 130.21, 360/84, 130.22, 130.23, 130.24; 242/199, 195; 226/91

[56] References Cited

U.S. PATENT DOCUMENTS

| 4,075,670 | 2/1978 | Namoto | 360/85 |
| 4,121,267 | 10/1978 | Hayashi | 360/95 |
| 4,138,699 | 2/1979 | Ura | 360/95 |
| 4,215,379 | 7/1980 | Lemelson | 360/85 |
| 4,365,277 | 12/1982 | Namiki | 360/85 |

Primary Examiner—Robert Martin Kilgore
Attorney, Agent, or Firm—Toren, McGeady and Stanger

[57] ABSTRACT

A record reproduction apparatus having a loading member operative to pull a tape out from a tape cassette for winding around a rotating head drum wherein a clutch mechanism transmits a rotating force of the loading member to a tape reel stand depending on the rotating direction of a loading ring so that a transmission of the rotating force by the clutch mechanism occurs only during unloading of the tape and not during fast forwarding and rewinding of the tape.

9 Claims, 4 Drawing Figures

RECORD REPRODUCTION APPARATUS

BACKGROUND OF THE INVENTION

1. Field of the Invention

The present invention relates to a tape loading and unloading mechanism of a taped record reproduction apparatus of the cassette type in which a tape is pulled out from a cassette and is wound around a rotating head drum at a prescribed position thereof for recording and reproducing video signals, etc.

2. Description of the Prior Art

During the unloading operation of a magnetized tape which has been pulled out from a cassette whereby the tape is housed again into the cassette in the video tape recorder (VTR or VCR) of a cassette type, in general, it is necessary that a tape pull out member be retracted into a cassette opening and that at the same time either or both of a feeding reel or a rewinding reel within the cassette be rotated in a tape take-up direction, in order for the magnetized tape, which has been slackened, to be wound back into the cassette. When such an operation is performed at the time of unloading, in a conventional apparatus a complicated mechanism is required to detect the unloading state in order for a take up idler to be engaged with or disengaged from the reel.

SUMMARY OF THE INVENTION

The present invention is intended to provide a record reproduction apparatus in which the shortcoming of conventional devices mentioned above can be eliminated.

Also an object of the present invention is to provide a simple arrangement for record reproduction apparatus which can prevent slack or sag of a tape which accompanies an unloading operation.

Also, another object of the present invention is to provide a record reproduction apparatus which does not create undesirable influence over high speed tape forwarding.

According to an embodiment of the present invention, engagement and disengagement of a clutch, which transmits a driving force to tape take up means at the time of unloading, are controlled in accordance with the rotating direction of loading means, and the driving force of the take up means can be utilized by the loading means, tape take up action at a time of unloading can be accomplished in a secure manner.

Also according to an embodiment of the present invention clutch means to effect a change over control of transmission of a driving force to the take up means by a shifting of the direction of the loading means are provided, whereby the take up means are driven only in an association with an unloading operation, thereby avoiding inconvenience at the time of loading.

Also according to an embodiment of the present invention a friction member is provided at a part of the transmission means, whereby malfunction seldom occurs even when an excessive load, etc. is applied on the apparatus.

Further, according to an embodiment of the present invention, an arrangement is employed whereby at a high speed running mode of a tape, the tape is at once placed in an unloading state and at the same time transmission of a driving force from loading means to take up means is cut off along with said placing of the tape in the unloading state, whereby the present invention can be applied in the tape high speed running mode without any difficulties.

BRIEF DESCRIPTION OF THE DRAWINGS

FIG. 1 shows the state in which loading is completed, and

FIG. 2 shows the state in which unloading is completed.

DESCRIPTION OF PREFERRED EMBODIMENTS

Figure 1:
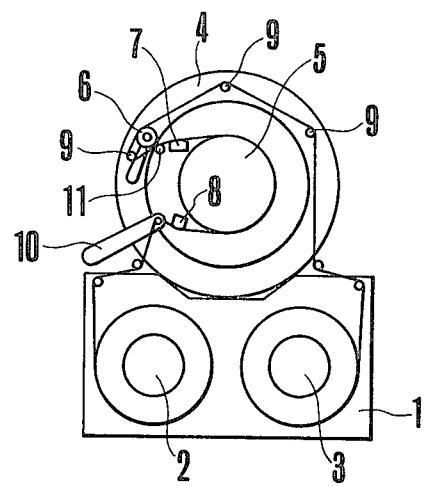
FIG. 1 and FIG. 2 are simplified schematic diagrams showing a loading mechanism as an example of a record reproduction apparatus according to the present invention.
Figure 2:
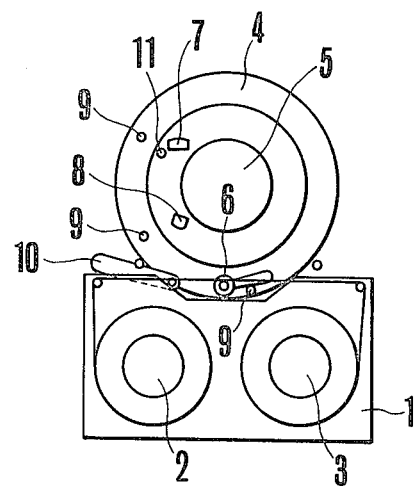

FIG. 1 and FIG. 2 show an example of a magnetic record reproduction apparatus in which the present invention is employed. The apparatus shown in the drawings is a loading mechanism including a loading ring for a VTR (VCR), wherein the loading operation of the apparatus in the drawings is of a known type, and thus only a simple outline thereof will be provided. In the drawings, 1 is a cassette which has a tape feeding reel 2 and a take-up reel 3 therein, wherein a magnetized tape is wound from the feeding reel 2 to the take up reel 3 along one side of a cassette. A ring 4 operates as loading means and rotates in a counterclockwise direction at the time of loading and rotates in a clockwise direction at the time of unloading. A rotation head drum unit 5 and a pinch roller 6 rotate together with the loading ring when loading is completed (FIG. 1) and are positioned near a capstan 11. The system includes a sound recording and reproduction head 7, a total width erasing head 8, a guide pole 9 mounted on the loading ring, and a loading arm 10.

A loading operation is performed first by pulling out the tape at a first running path within the cassette 1 with the pinch roller 6 and a forward guide by a counterclockwise rotation of the loading ring 4. The tape is then pulled out from the cassette to the left by a counterclockwise rotation of the loading arm 10 in association with rotation of the loading ring 4 whereby the tape is brought into contact with the total width erasing head 8. The pinch roller 6 is positioned near the capstan 11 which is positioned on a base plate and at the loading completion position of FIG. 1. The tape is held between the pinch roller 6 and capstan 11 so that the tape is made to run.

Next, at the time of unloading, the loading ring 4 is rotated in a clockwise direction opposite to the direction of rotation at the time of a loading operation to return it to the condition of FIG. 2 from the condition of FIG. 1. As the tape is slackened at this time it is necessary to take up the slack to the reel 2 or the reel 3 within the cassette 1 as the take up means. While the example shown in FIGS. 1 and 2 indicates a situation in which this slackened tape is taken up by the feeding reel 2, taking up of the tape at the time of unloading may be effected either by the feeding reel 2 or by the take up reel 3 or by both.

Figure 3:
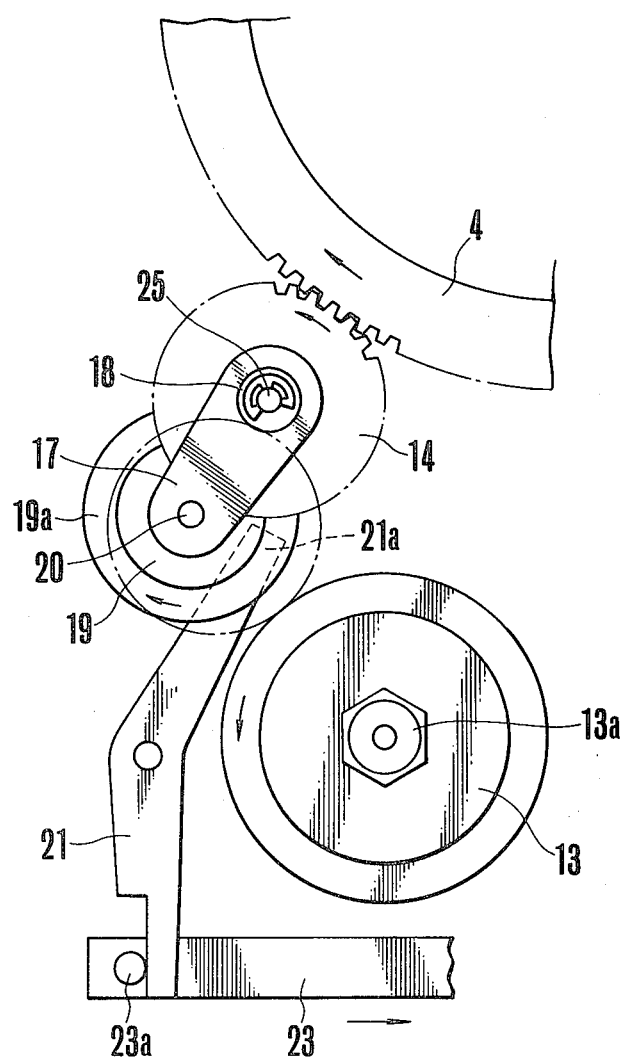
FIG. 3 is an enlarged plan view to show an arrangement around a feeding reel stand in the apparatus of the present invention.
Figure 4:
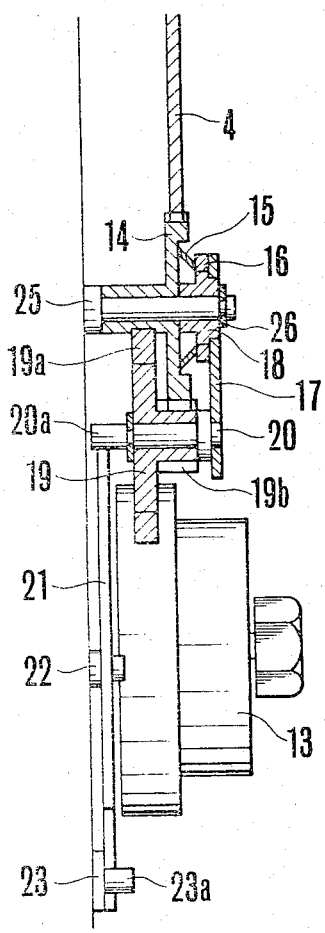
FIG. 4 is an enlarged side elevation of the component portion shown in FIG. 3.

FIG. 3 is an enlarged plan view to show the arrangement near a feeding reel stand 13 in the above-mentioned example of the present invention. FIG. 4 is an enlarged sectional side elevation of the component portion shown in FIG. 3.

In these drawings the loading ring 4 rotates in the clockwise direction (shown by an arrow) at the time of unloading and a gear 14 is rotated in the counterclockwise direction by a gear part provided at an outer circumference of the ring. The gear 14 is axially supported by a shaft 25 mounted on the base plate in a rotatable manner. A clutch arm 17 is fixed at a part of said shaft 25 with a bearing boss part 18 while a take up idler shaft 20 is fixed at the other end. The bearing 18 is rotatably attached to the shaft 25 and by cooperation of a wave washer 15 and a washer 16, it is restrained in a thrust direction by an E ring 26. The gear 14 and the clutch arm 17 are friction coupled by a spring force of said wave washer 15. Further, an idler 19 is rotatably attached to the shaft 20. The idler 19 has an elastic member 19a which may be formed of rubber at the outer periphery of its larger diameter circumference and it has a gear 19b at the shaft thereof, wherein said gear 19b and the gear 14 are in an engaged state. Thus the gear in the ring 4, the gears 14, 19b and the elastic member 19a consist of transmission means.

Therefore, when the loading ring 4 rotates in the clockwise direction at the time of unloading, the gear 14 rotates counterclockwise and the clutch arm 17 which is friction coupled with said gear 14 also rotates counterclockwise. As a result, the take up idler 19 is brought into pressure contact against an outer circumference of the feeding reel stand 13. When the pressure contacting direction of the idler 19 against the feeding reel stand 13 is in a thrusting direction, the rotation of the idler 19 is transmitted to the reel stand 13 and the reel stand 13 rotates in the counterclockwise direction which is the tape take up direction, and thus the tape which has been slackened at the time of unloading is taken up.

Also, since the rotation of the reel stand 13 is stopped at the same time that the rotation of the loading ring 4 is stopped as the unloading is completed, it is not necessary to change over the clutch. Further, if the take up rotation number is set somewhat higher than the rotation number actually required for take up and the reel stand 13 and a reel spindle 13a are made to friction couple with each other, the possibility of leaving excess tape will be eliminated. Also when loading is effected after the unloading is completed, while the take up idler 19 is in contact with the outer circumference of the reel stand 13, the clutch arm 17 rotates clockwise in a reverse direction to that during operation at the time of unloading as the counterclockwise rotation of the loading ring 4 at the time of the loading is started. The take up idler 19 separates from the outer circumference of the reel stand 13 and comes in contact with a stopper (not shown) and is stopped by a slight movement thereof. Further, since there is no load on the take up idler 19 while the loading operation is performed, the loading operation can be effected without difficulties.

Next, when the take up idler 19 comes in contact with the outer circumference of the reel stand 13 during high speed running such as during tape fast forwarding take up, etc., a braking action is effected whereby at the time of fast forwarding and rewinding, it is necessary to keep the take up idler 19 out of contact with the reel stand 13 in an association with said braking. This is done by shifting a slider 23 to the right in association with the above-mentioned fast forwarding and rewinding operations thereby rotating a lever 21 in the counterclockwise direction by a pin 23a mounted on the slider 23.

This will cause checking of a fore end part 20a of the take up idler shaft by one end 21a of the lever 21, thus keeping the take up idler 19 from coming in contact with the outer circumference of the reel stand 13.

As has been explained above, in the magnetic record reproduction apparatus of the present invention a take up operation at a time of unloading can be securely performed by a simple arrangement, and an apparatus, which can secure stable operation without requiring a complicated mechanism as in a conventional method, can be obtained, thus providing great advantages.

What is claimed is:

1. An apparatus for recording signals on and/or reproducing recorded signals from a belt-shaped recording medium, comprising:
   (a) recording and/or reproducing means for recording signals on and/or reproducing recorded signals from said recording medium;
   (b) loading means for loading said recording medium on said recording and/or reproducing means, said loading means being movable between an unloading position where the loading means unloads the recording medium from the recording and/or reproducing means and a loading position where the loading means loads the recording medium on the recording and/or reproducing means;
   (c) take-up means for taking up said recording medium; and
   (d) transmission means for transmitting the movement of said loading means to said take-up means to cause the take-up means to take up said recording medium in association with the movement of the loading means when the loading means moves from said loading position to said unloading position.

2. The apparatus according to claim 1, wherein said transmission means includes:
   a first member coupled to said loading means for receiving the movement of the loading means;
   a second member coupled to said first member and couplable to said take-up means for transmitting the movement of said loading means received at the first member to the take-up means; and
   a third member responsive to the movement of said loading means from said loading position to said unloading position received at said first member for coupling said second member to said take-up means so that the second member transmits the movement of the loading means received at the first member to the take-up means when the loading means moves from the loading position to the unloading position.

3. The apparatus according to claim 2, wherein said loading means includes a rotatable member rotatable between said unloading position and said loading position;
   said first member of said transmission means being coupled to said rotatable member and rotatable in response to the rotation of the rotatable member;
   said second member of said transmission means being rotatable in response to the rotation of said first member to drive said take-up means; and
   said third member of said transmission means being arranged to couple said second member to said take-up means in response to the rotation of said first member in a predetermined direction which corresponds to the rotation of said rotatable member from said loading position to said unloading position.

4. The apparatus according to claim 3, wherein said first member is rotatable about a first axis; said second member is rotatable about a second axis supported by said third member; and said third member is rotatable about said first axis and is coupled to said first member through friction means so that the third member swings said second member to couple the second member to said drive member in response to the rotation of the first member in said predetermined direction.

5. A video recording and/or reproducing apparatus for use with a magnetic tape contained in a cassette, said cassette having a pair of reels for winding said tape, said apparatus comprising:
  (a) magnetic recording and/or reproducing means for recording video signals on and/or reproducing recorded video signals from said tape;
  (b) tape loading means for loading said tape on said recording and/or reproducing means, said loading means being movable between a loading position where the loading means enables the tape to cooperate with the recording and/or reproducing means at the outside of said cassette and an unloading position where the loading means enables the tape to be contained in the cassette; and
  (c) take-up drive means for driving at least one of said reels of said cassette for a tape take-up when said loading means moves from said loading position to said unloading position, said drive means being arranged to receive driving power from the loading means as the loading means moves from the loading position to the unloading position.

6. The apparatus according to claim 5, wherein said take-up drive means includes:
  a reel drive member couplable to one of said reels and rotatable together with the coupled reel for the tape take-up; and
  a conversion mechanism for converting the movement of said loading means from said loading position to said unloading position into the rotation of said drive member for the tape take-up.

7. The apparatus according to claim 6, wherein said conversion mechanism includes:
  a first member coupled to said loading means for receiving the movement of the loading means;
  a second member coupled to said first member and couplable to said drive means for transmitting the movement of said loading means received at the first member to the drive member; and
  a third member responsive to the movement of said loading means from said loading position to said unloading position received at said first member for coupling said second member to said drive member so that the second member transmits the movement of the loading means received at the first member to the drive member when the loading means moves from the loading position to the unloading position.

8. The apparatus according to claim 7, wherein said loading means includes a rotatable member rotatable between said unloading position and said loading position;
  said first member of said conversion mechanism being coupled to said rotatable member and rotatable in response to the rotation of the rotatable member;
  said second member of said conversion mechanism being rotatable in response to the rotation of said first member to rotate said drive member; and
  said third member of said conversion mechanism being arranged to couple said second member to said drive member in response to the rotation of said first member in a predetermined direction which corresponds to the rotation of said rotatable member from said loading position to said unloading position.

9. The apparatus according to claim 8, wherein said first member is rotatable about a first axis; said second member is rotatable about a second axis supported by said third member; and said third member is rotatable about said first axis and is coupled to said first member through friction means so that the third member swings said second member to couple the second member to said drive member in response to the rotation of the first member in said predetermined direction.

* * * * *